(12) United States Patent
Chern et al.

(10) Patent No.: US 8,853,875 B2
(45) Date of Patent: Oct. 7, 2014

(54) WIND POWER GENERATION SYSTEM AND METHOD FOR CONTROLLING EXCITATION SYNCHRONOUS GENERATOR THEREOF

(75) Inventors: Tzuen-lih Chern, Kaohsiung (TW);
Der-min Tsay, Kaohsiung (TW);
Jao-hwa Kuang, Kaohsiung (TW);
Li-hsiang Liu, Kaohsiung (TW);
Wei-ting Chen, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 144 days.

(21) Appl. No.: 13/617,346

(22) Filed: Sep. 14, 2012

(65) Prior Publication Data

US 2014/0015249 A1    Jan. 16, 2014

(30) Foreign Application Priority Data

Jul. 16, 2012    (TW) .............................. 101125580 A

(51) Int. Cl.
*H02P 9/04*    (2006.01)

(52) U.S. Cl.
USPC ........................................................ 290/44

(58) Field of Classification Search
CPC .......... F03D 9/002; Y02E 10/766; H02P 9/04
USPC ...................................................... 290/44, 55
See application file for complete search history.

(56) References Cited

U.S. PATENT DOCUMENTS

| | | | | |
|---|---|---|---|---|
| 5,476,293 | A * | 12/1995 | Yang | 290/4 C |
| 8,097,967 | B2 * | 1/2012 | Hamilton | 290/1 A |
| 2008/0296898 | A1 * | 12/2008 | Ichinose et al. | 290/44 |
| 2010/0060003 | A1 * | 3/2010 | DeAngeles | 290/44 |
| 2010/0314873 | A1 * | 12/2010 | Stone | 290/44 |
| 2011/0089694 | A1 * | 4/2011 | Arinaga et al. | 290/44 |

* cited by examiner

*Primary Examiner* — Tulsidas C Patel
*Assistant Examiner* — Sean Gugger
(74) *Attorney, Agent, or Firm* — Muncy, Geissler, Olds & Lowe, P.C.

(57) ABSTRACT

A stand-alone wind power generation system and a method for controlling an excitation synchronous generator thereof are provided. In this method, an input wind power is transformed into an electrical power and outputted to a load. With the use of a coaxial configuration, a windmill, a speed-increasing gearbox, the excitation synchronous generator, and a motor are integrated in the same shaft. The output voltage of the generator is stabilized by an excitation field control. With the use of a motor servo control, the speed of generator can be stabilized under a wind disturbance condition. Therefore, the output power and frequency can be stable. A power flow management unit can control battery sets to charge and discharge, so as to accomplish the proposed control method.

8 Claims, 5 Drawing Sheets

WIND POWER GENERATION SYSTEM AND METHOD FOR CONTROLLING EXCITATION SYNCHRONOUS GENERATOR THEREOF

FIELD OF THE INVENTION

The present invention relates to a generation system and a method for controlling a generator thereof, and more particularly, to a stand-alone wind power generation system and a method for controlling an excitation synchronous generator thereof. In the wind power generation system, with a coaxial configuration and an excitation field control, an input wind power of the excitation synchronous generator is converted into an electrical power for outputting, and a motor is used for a speed servo control of the excitation synchronous generator. In a power flow management method, battery sets and power converters cooperate with each other, and an input power of the motor is detected for storing and releasing power, so as to use the excitation synchronous generator in the stand-alone wind power generation system.

BACKGROUND OF THE INVENTION

Currently, in a general power generation system, a permanent magnet generator is mainly used for generating an electrical power, and an AC-to-DC converter, batteries and a DC-to-AC converter are required to convert the generated power and to output the converted power. However, this power conversion will result in a power loss in power converting, thereby reducing a conversion efficiency of the power generation system, as well as increasing a cost of power generation equipments. When the inputted power source varies, or when the load of the utility grid is raised, the permanent magnet generator can not control the excitation current thereof. Therefore, when the energy required for a load terminal is increased, a voltage from an output terminal can not be stable, thereby reducing the output energy quality.

SUMMARY OF THE INVENTION

The stand-alone wind power generation system can comprise a windmill, a driving shaft, a speed-increasing gearbox, an excitation synchronous generator, a motor, a driver, an encoder, a current detector, a boost converter, at least one battery set, a buck converter with rectification, a load and a digital signal processer.

An aspect of the present invention is to provide a method for controlling an excitation synchronous generator of a stand-alone wind power generation system. With the use of a coaxial configuration, an input of the windmill, the speed-increasing gearbox, the excitation synchronous generator and the motor are integrated on the same driving shaft, so as to converting an input wind power into an electrical power for outputting to the load. When the inputted wind power is sufficient, the excitation synchronous generator can directly provide the electrical power to the load, and at the same time, with the control of the power flow management unit and the digital signal processer, the battery set is charged through the buck converter with rectification. When the inputted wind power is insufficient, with the use of the power flow management unit, a servo control is performed by the battery set, the boost converter and the motor, and the power stored in the battery is provided to the motor, so as to stabilize a rotation speed of the excitation synchronous generator. Accordingly, a frequency of an output voltage thereof can be stable. In addition, with the use of the excitation field control, a voltage information is fed back to control the excitation field of the excitation synchronous generator, so as to stabilize the output voltage thereof.

In the present invention, the input wind power is transformed into the electrical power and outputted to a load. At the same time, with the use of the excitation field control, it is achieved to stabilize the output voltage thereof. With the use of a motor servo control, the speed of generator can be stabilized under a wind disturbance condition. Therefore, the output power and frequency can be stable. A power flow management unit can detect the input power of the motor and comprise power converters and battery sets for storing and releasing power, so as to control the excitation synchronous generator of the stand-alone wind power generation system.

In one embodiment of the present invention, the control method further comprises the following steps: when the input wind power varies, performing a motor servo control to stabilize a rotation speed and an output power frequency of the excitation synchronous generator, wherein, during a process of the motor servo control, wherein the electrical power stored in the battery set is provided for a driver through the power converter, and the driver is configured to drive the motor.

In one embodiment of the present invention, when the electrical power stored in the battery set is insufficient, the electrical power for driving the motor is provided by a utility grid.

In one embodiment of the present invention, the control method further comprises the following steps: utilizing a voltage adjustment control to feed back an output voltage of the excitation synchronous generator, and comparing the output voltage with a voltage command, and performing an excitation field control to adjust the output voltage of the excitation synchronous generator.

According to another embodiment of the present invention, the wind power generation system comprises: a driving shaft; a windmill disposed on the driving shaft; a excitation synchronous generator disposed on the driving shaft for converting an input wind power of the windmill into an electrical power to be outputted to a load; a motor disposed on the driving shaft; and a power flow management unit connected to the motor, wherein, when the wind power generation system is in a stable state, the power flow management unit is utilized to detect an input power of the motor, and to utilize a power converter with rectification to process the electrical power, so as to store the electrical power in at least one battery set.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
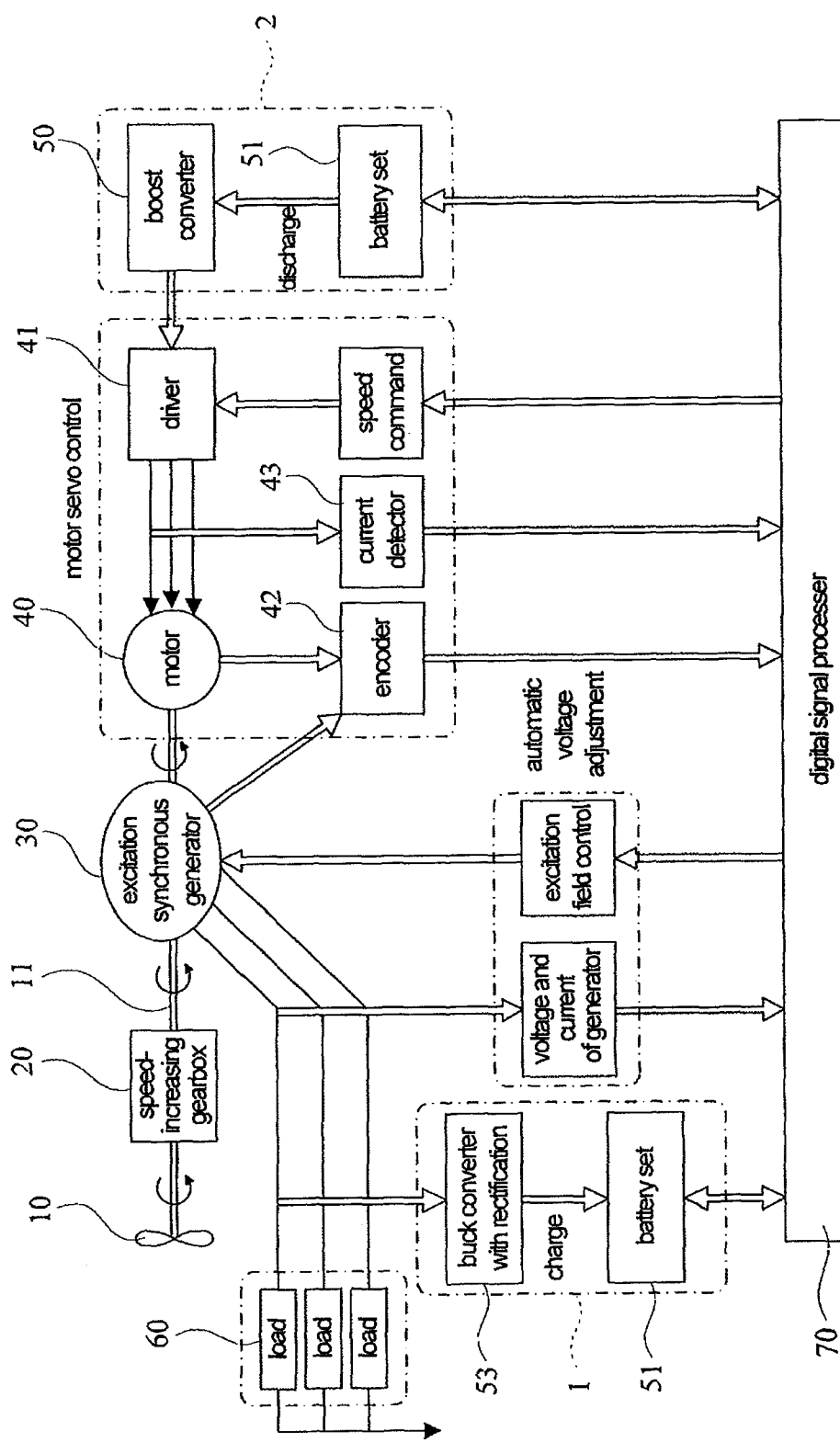
FIG. 1 is a schematic diagram showing a system using a method for controlling an excitation synchronous generator of a stand-alone wind power generation system according to one embodiment of the present invention.

In order to make the illustration of the present invention more explicit and complete, the following description is stated with reference to FIG. 1 through FIG. 5.

In the drawings, like reference numerals indicate like components or items.

Referring to FIG. 1, FIG. 1 is a schematic diagram showing a system using a method for controlling an excitation synchronous generator of a stand-alone wind power generation system according to one embodiment of the present invention. The method of the present invention can be applicable to a wind power generation system which is described below. However, the method may be applicable to other power systems, such as waterpower, firepower and tidal power system, but not limited to the above description. The present invention can be used for a control technique of a renewable energy relating to any power generation systems.

Referring to FIG. 1 again, the generation system of the present invention can comprise a windmill 10, a driving shaft 11, a speed-increasing gearbox 20, an excitation synchronous generator 30, a motor 40, a driver 41, an encoder 42, a current detector 43, a boost converter 50, at least one battery set 51, a buck converter 53 with rectification, a load 60 and a digital signal processer 70.

Referring to FIG. 1 again, when the windmill 10 inputs a wind power, with the use of a coaxial configuration, the input of the windmill 10, the speed-increasing gearbox 20, the excitation synchronous generator 30 and the motor 40 are integrated on the same driving shaft 11, such that an input wind power is transmitted to the excitation synchronous generator 30 through the speed-increasing gearbox 20, and is converted into an electrical power for outputting to the load 60. The digital signal processer 70 is used for excitation field control, so as to control an excitation field of the excitation synchronous generator 30 for automatic voltage adjustment, thereby stabilizing an output voltage from the excitation synchronous generator 30.

Referring to FIG. 1 again, when the inputted wind power is sufficient, the excitation synchronous generator 30 can provide the output power to the load 60, and also can provide the additional power to the battery set 51 through the buck converter 53 with rectification of a first power flow management unit 1 for storing the electrical power therein, so as to sufficiently use the outputted electrical power.

Referring to FIG. 1 again, when the inputted wind power is insufficient, a rotation speed of the excitation synchronous generator 30 is affected, thereby changing a frequency of an output power thereof. Therefore, in the control method of the present invention, a motor servo control is performed for stabilizing the rotation speed and the output power frequency of the excitation synchronous generator 30. The rotation speed and frequency of the excitation synchronous generator 30 and the motor 40 can be obtained by using the digital signal processer 70 to process the information outputted from the encoder 42. When a rotation error is detected by comparing the rotation speed of the excitation synchronous generator 30 with a predetermined rotation speed, the digital signal processer 70 outputs a speed command to the driver 41, such that the driver 41 can perform a speed servo control according to the speed command, thereby stabilizing the rotation speed of the excitation synchronous generator 30 and the output voltage thereof.

Referring to FIG. 1 again, with the use of the battery set 51 and the motor 40 of a second power flow management unit 2, an electrical power for the speed servo control of the motor is provided. In the second power flow management unit 2, the electrical power stored in the battery set 51 is boosted by the boost converter 50, so as to provide the boosted power to the driver 41 for motor servo control. Thus, the motor 40 can provide a power for the excitation synchronous generator 30 to stabilize the rotation speed of the excitation synchronous generator 30 and the output voltage thereof. When the electrical power stored in the battery set 51 is insufficient, the power for driving the motor 40 can be provided by a utility grid.

Figure 2:
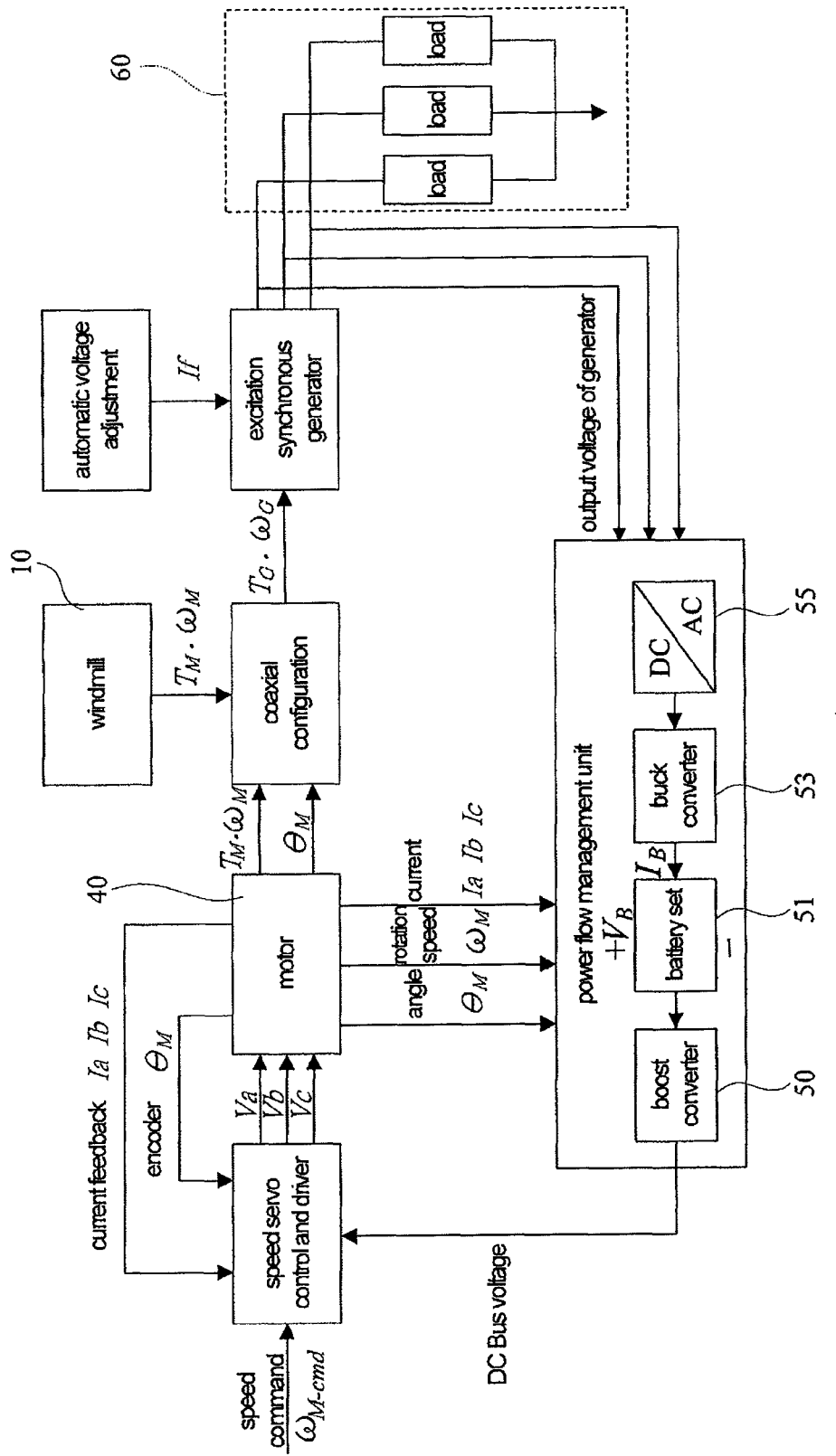
FIG. 2 is a block diagram showing a speed servo control of the excitation synchronous generator of the wind power generation system according to one embodiment of the present invention.

Referring to FIG. 2, with the use of a motor angle $\theta_M$ obtained by the encoder 42, a motor speed $\omega_M$ can be obtained. According to the rotation error which is obtained by comparing the speed command $\omega_{M\text{-}cmd}$ and the motor speed $\omega_M$, a speed servo controller and the driver 41 can control a rotation speed of the motor 40. With the use of the coaxial configuration, a rotation speed $\omega_W$ and a torque $T_W$ of the windmill 10 and the motor speed $\omega_M$ and a torque $T_G$ of the motor 40 can be integrated to provide a rotation speed $\omega_G$ and a torque $T_G$ for the excitation synchronous generator 30. At the same time, according to the automatic voltage adjustment, a control signal $I_f$ is generated for adjusting the excitation field of the excitation synchronous generator 30, so as to stabilize the output voltage of the excitation synchronous generator 30 and to output the electrical power to the load 60.

Referring to FIG. 2 again, the above-mentioned first and second power flow management units 1 and 2 can be integrated into one power flow management unit, and the integrated power flow management unit can comprise the boost converter 50, the battery set 51, the buck converter 53 and an AC-DC converter 55.

Referring to FIG. 2 again, when the power of the inputted wind power is sufficient, the output voltage of the excitation synchronous generator 30 is converted into a charge current $I_B$ through the AC-DC converter 55 and the buck converter 53 of the power flow management unit, so as to charge the battery set 51, thereby storing the electrical power therein. Moreover, an input power of the motor 40 can be obtained for controlling the charge of the battery set 51 according to the information of the motor 40, such as input voltages $V_a, V_b, V_c$, currents $I_a, I_b, I_c$, a rotation speed $\omega_M$, angle $\theta_M$ and the like. When the input wind power varies, the power stored in the battery set 51 is released and is boosted by the boost converter, so as to provide a DC Bus voltage required for the driver, thereby achieving a speed servo control of the motor.

Figure 3:
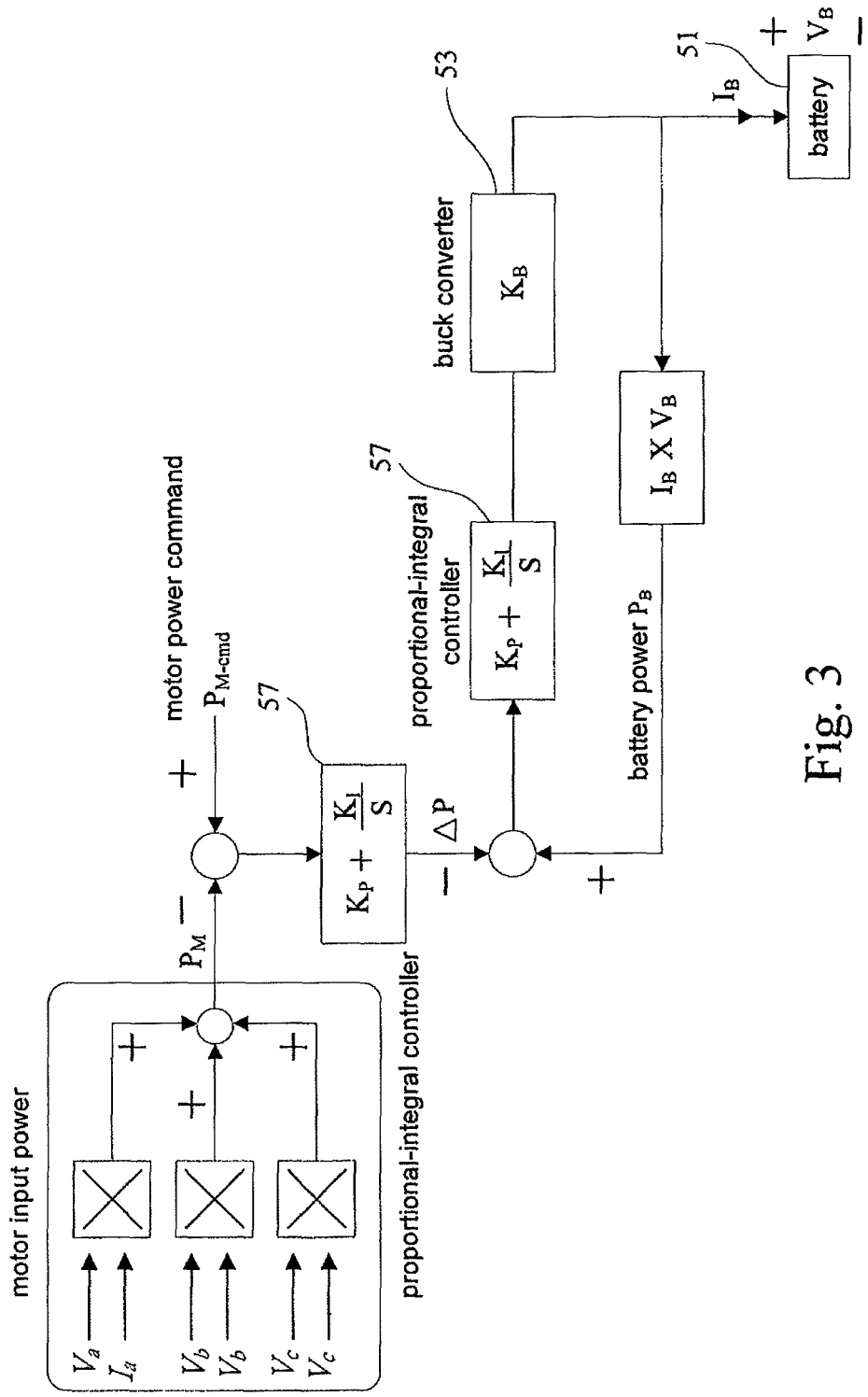
FIG. 3 is a block diagram showing a charge control of battery sets according to one embodiment of the present invention.

Referring to FIG. 3, when charging the battery set 51, in a power control method, the current detector 43 feeds the currents $I_a, I_b, I_c$ of the motor 40 back to the digital signal processer 70, and the input power $P_M$ of the motor 40 is obtained according to the input voltages $V_a, V_b, V_c$ of the motor 40, and the input power $P_M$ is compared with a motor power command $P_{M\_cmd}$. In a stable state of the system, the motor power command $P_{M\_cmd}$ will be determined as zero, and a compared result is then processed by a proportional-integral controller 57 to obtain a signal $\Delta P$, wherein $K_P$ and $K_I$ are a proportional parameter and an integral parameter, respectively. At this time, a battery charge power $P_B$ obtained by multiplying a voltage $V_B$ and a charge current $I_B$ of the battery set 51 is fed back and compared with the signal $\Delta P$, and then the compared result is then processed by the proportional-integral controller 57 to obtain a control signal, and then the control signal is processed by a buck gain $K_B$ of the buck converter for controlling the charge of the battery set 51.

Figure 4:
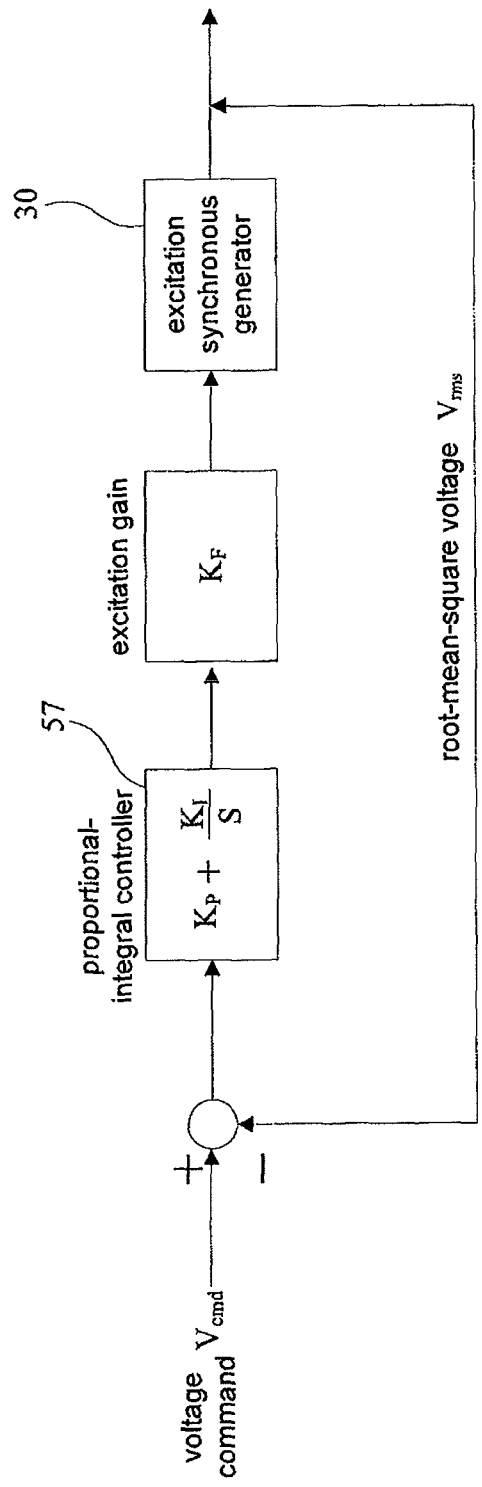
FIG. 4 is a block diagram showing a voltage adjustment control according to one embodiment of the present invention.

Referring to FIG. 4, when controlling the output voltage of the excitation synchronous generator, a root-mean-square voltage $V_{rms}$ is fed back and compared with a voltage command $V_{cmd}$, so as to obtain a voltage error. Then, the voltage error is processed by the proportional-integral controller 57 and an excitation gain $K_F$, so as to generate an excitation control signal for adjusting the output voltage of the excitation synchronous generator, as well as achieving a stable output.

Figure 5:
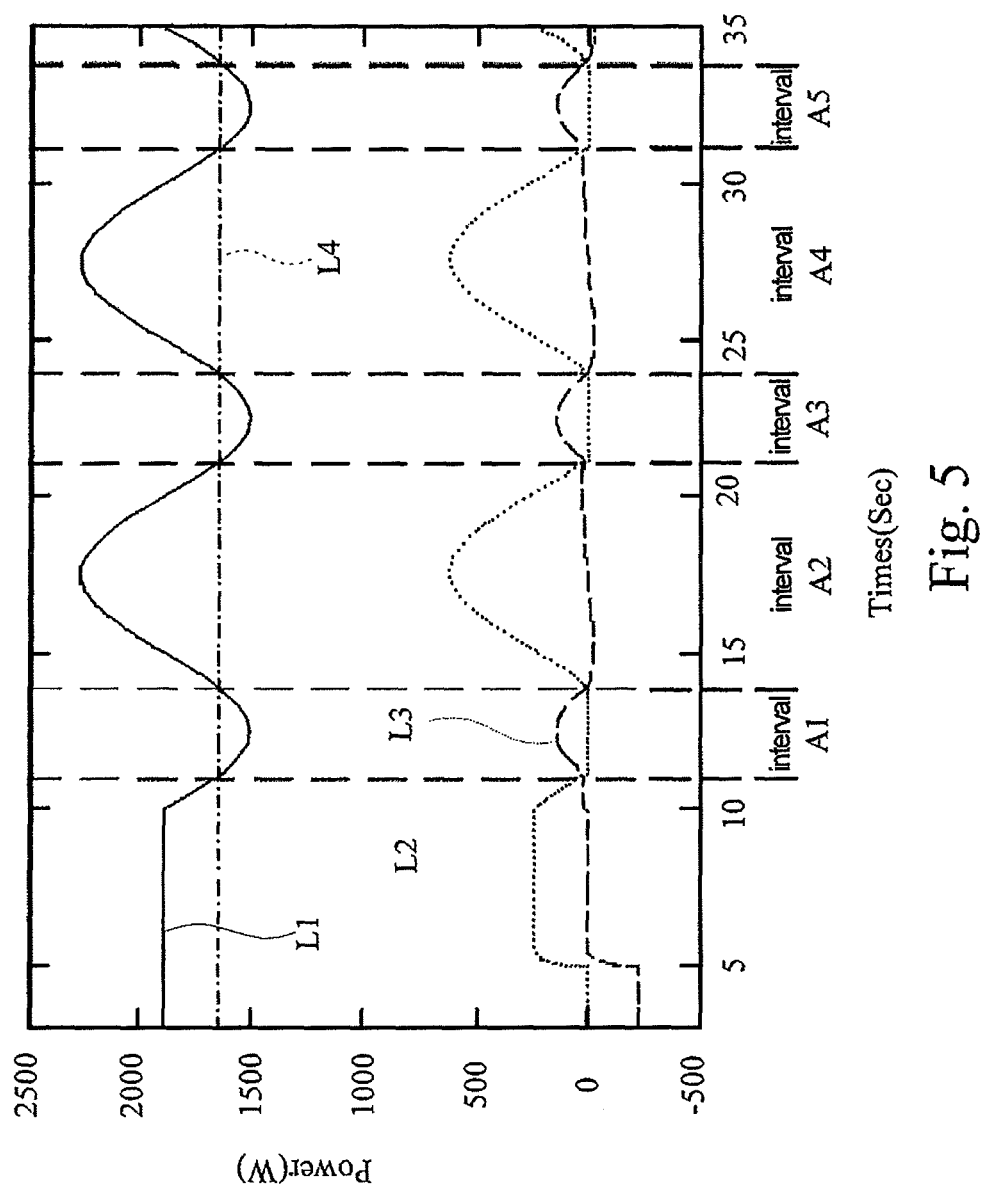
FIG. 5 is a schematic diagram showing a simulation of a power flow management according to one embodiment of the present invention.

As shown in FIG. 5, a line L1 indicates the input power of the windmill 10, and a line L2 indicates the power stored in the battery set 51, and a line L3 indicates the power provided by the motor 40, and a line L4 indicates the power outputted from the generator 30 to the load 60. Referring to FIG. 5 again, before the time point of 10 seconds, the input wind power is sufficient and stable, and thus the battery set 51 is charged for storing power, and the motor 40 is not required to provide power. In the intervals A1, A3, A5, the input wind power varies, and the input wind power is less than the power outputted from the generator 30 to the load 60, and thus the electrical power stored in the battery set 51 is provided for driving the driver, so as to stabilize the power of the load 60. In the intervals A2, A4, the input wind power is greater than the power outputted from the generator 30 to the load 60, and thus the generator 30 can output the electrical power not only for the load 60 but also for the battery set 51 to store the power. At this time, the motor 40 is not required to provide power.

As is understood by a person skilled in the art, the foregoing embodiments of the present invention are strengths of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A method for controlling an excitation synchronous generator of a wind power generation system, comprising the following steps:

transforming an input wind power of a windmill into an electrical power and outputting to a load, wherein an input of the windmill, the excitation synchronous generator and a motor are integrated on a driving shaft;

when the wind power generation system is in a stable state, utilizing a power flow management unit to detect an input power of the motor, and utilizing a power converter with rectification to process the electrical power, so as to store the electrical power in at least one battery set; and when the input wind power varies, performing a motor servo control to stabilize a rotation speed and an output power frequency of the excitation synchronous generator, wherein, during a process of the motor servo control, the electrical power stored in the battery set is provided for a driver through the power converter, and the driver is configured to drive the motor;

wherein, when the power of the inputted wind power is sufficient, an output voltage of the excitation synchronous generator is converted into a charge current through converters of the power flow management unit, so as to charge the battery set, and the input power of the motor for controlling the charge of the battery set is obtained according to input voltages and currents of the motor;

wherein, the input power is compared with a motor power command, and a compared result is processed by a proportional-integral controller to obtain a signal, and a battery charge power obtained by multiplying a voltage and a charge current of the battery set is fed back and compared with the signal, and another compared result is then processed by the proportional-integral controller to obtain a control signal, and the control signal is processed by a buck gain of the buck converter for controlling the charge of the battery set.

2. The method as claimed in claim 1, wherein, when the electrical power stored in the battery set is insufficient, the electrical power for driving the motor is provided by a utility grid.

3. The method as claimed in claim 1, further comprising the following steps:

utilizing a voltage adjustment control to feed back an output voltage of the excitation synchronous generator, and comparing the output voltage with a voltage command, and performing an excitation field control to adjust the output voltage of the excitation synchronous generator.

4. A wind power generation system, comprising:

a driving shaft;

a windmill disposed on the driving shaft;

an excitation synchronous generator disposed on the driving shaft for converting an input wind power of the windmill into an electrical power to be outputted to a load;

a motor disposed on the driving shaft; and a power flow management unit connected to the motor, wherein, when the wind power generation system is in a stable state, the power flow management unit is utilized to detect an input power of the motor, and to utilize a power converter with rectification to process the electrical power, so as to store the electrical power in at least one battery set;

wherein, when the input wind power varies, a motor servo control is performed to stabilize a rotation speed and an output power frequency of the excitation synchronous generator, and during a process of the motor servo control, the electrical power stored in the battery set is provided for a driver through the power converter, and the driver is configured to drive the motor;

wherein, when the power of the inputted wind power is sufficient, an output voltage of the excitation synchronous generator is converted into a charge current through converters of the power flow management unit, so as to charge the battery set, and the input power of the motor for controlling the charge of the battery set is obtained according to input voltages and currents of the motor;

wherein, the input power is compared with a motor power command, and a compared result is processed by a proportional-integral controller to obtain a signal, and a battery charge power obtained by multiplying a voltage and a charge current of the battery set is fed back and compared with the signal, and another compared result is then processed by the proportional-integral controller to obtain a control signal, and the control signal is processed by a buck gain of the buck converter for controlling the charge of the battery set.

5. The method as claimed in claim 1, wherein, in the motor servo control, the rotation speed and an output power frequency of the excitation synchronous generator are obtained by using a digital signal processer to process an information outputted from an encoder, and when a rotation error is detected by comparing the rotation speed of the excitation synchronous generator with a predetermined rotation speed, the digital signal processer outputs a speed command to the driver, such that the driver perform a speed servo control according to the speed command, thereby stabilizing the rotation speed and the output power frequency of the excitation synchronous generator.

6. The method as claimed in claim 5, wherein, in the speed servo control, a motor angle of the motor is obtained by the encoder for obtain a motor speed of the motor, and according to another rotation error which is obtained by comparing the speed command and the motor speed, a speed servo controller and the driver control a rotation speed of the motor.

7. The method as claimed in claim 1, wherein, when charging the battery set, a current detector feeds an information of the currents of the motor back to the digital signal processer.

8. The method as claimed in claim 1, wherein, when controlling the output voltage of the excitation synchronous generator, a root-mean-square voltage is fed back and compared with a voltage command, so as to obtain a voltage error, and the voltage error is processed by a proportional-integral controller and an excitation gain, so as to generate an excitation control signal for adjusting the output voltage of the excitation synchronous generator.

* * * * *